(12) United States Patent
Yerramalli et al.

(10) Patent No.: US 11,785,421 B2
(45) Date of Patent: Oct. 10, 2023

(54) NEURAL NETWORK BASED LINE OF SIGHT DETECTION FOR POSITIONING

(71) Applicant: QUALCOMM Incorporated, San Diego, CA (US)

(72) Inventors: Srinivas Yerramalli, Hyderabad (IN); Taesang Yoo, San Diego, CA (US); Lorenzo Ferrari, Oakland, CA (US); Xiaoxia Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 39 days.

(21) Appl. No.: 17/226,201

(22) Filed: Apr. 9, 2021

(65) Prior Publication Data
US 2021/0321221 A1    Oct. 14, 2021

Related U.S. Application Data

(60) Provisional application No. 63/009,571, filed on Apr. 14, 2020.

(51) Int. Cl.
*H04W 4/029* (2018.01)
*H04W 4/02* (2018.01)
(Continued)

(52) U.S. Cl.
CPC ............ *H04W 4/029* (2018.02); *G06N 3/045* (2023.01); *H04L 25/0212* (2013.01);
(Continued)

(58) Field of Classification Search
CPC ..... H04W 4/029; H04W 4/025; H04W 64/00; H04W 4/02; G06N 3/0454; G06N 3/0481;
(Continued)

(56) References Cited

U.S. PATENT DOCUMENTS

2007/0287473 A1    12/2007  Dupray
2020/0059770 A1*    2/2020  Smith ................... G01S 5/02
(Continued)

OTHER PUBLICATIONS

Eom C., et al., "A Deep Neural Network-Based LOS Classification for Triangulation Positioning", 2020 International Conference on Artificial Intelligence in Information and Communication (ICAIIC), IEEE, Feb. 19, 2020 (Feb. 19, 2020), pp. 598-601, XP033755722, DOI: 10.1109/ICAIIC48513.2020.9065061, [retrieved on Apr. 13, 2020], p. 598, "I. Introduction" p. 599, "III. Los Classification and Localization Scheme".

(Continued)

*Primary Examiner* — Kabir A Timory
(74) *Attorney, Agent, or Firm* — SUNSTEIN LLP

(57) ABSTRACT

Techniques are provide for neural network based positioning of a mobile device. An example method for determining a line of sight delay, an angle of arrival, or an angle of departure value, according to the disclosure includes receiving reference signal information, determining a channel frequency response or a channel impulse response based on the reference signal information, processing the channel frequency response or the channel impulse response with a neural network, and determining the line of sight delay, the angle of arrival, or the angle of departure value based on an output of the neural network.

26 Claims, 15 Drawing Sheets

(51) Int. Cl.
  *H04L 25/02* (2006.01)
  *H04W 64/00* (2009.01)
  *G06N 3/045* (2023.01)
(52) U.S. Cl.
  CPC ......... *H04L 25/0226* (2013.01); *H04W 4/025* (2013.01); *H04W 64/00* (2013.01)
(58) Field of Classification Search
  CPC ................. G06N 3/08; H04L 25/0212; H04L 25/0226; H04L 25/022; H04L 25/0254; G01S 5/12; G01S 5/14; G01S 3/043; G01S 5/0218; G01S 5/0278; G01S 11/02
  See application file for complete search history.

(56) References Cited

U.S. PATENT DOCUMENTS

2020/0333424 A1* 10/2020 Shi .......................... H04W 8/22
2021/0096207 A1* 4/2021 Torrini ................... G06N 3/045

OTHER PUBLICATIONS

International Search Report and Written Opinion—PCT/US2021/026773—ISA/EPO—dated Jul. 1, 2021.
Zhenyu S., et al., "Neural Network Based Localization Using Outdoor LTE Measurements", 2018 10th International Conference on Wireless Communications and Signal Processing (WCSP), IEEE, Oct. 18, 2018 (Oct. 18, 2018), pp. 1-6, XP033460278, DOI: 10.1109/WCSP.2018.8555885 [retrieved on Nov. 30, 2018], Abstract, pp. 1-2, "I. Introduction", p. 3, "III. Outdoor Field Scenario"—p. 4, "B. Training with Channel Coefficients".

* cited by examiner

NEURAL NETWORK BASED LINE OF SIGHT DETECTION FOR POSITIONING

CROSS-REFERENCE TO RELATED APPLICATIONS

This application claims the benefit of U.S. Provisional Application No. 63/009,571, filed Apr. 14, 2020, entitled "Neural Network Based Line of Sight Detection for Positioning," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. 5G networks, for example, will be deployed with larger bandwidths (BW), use higher frequencies such as millimeter wave (mmW) spectrum, have denser topologies and will use large antenna arrays enabling directional transmissions. These 5G networks are designed for both outdoor and indoor deployments and may support deployment by private entities other than cellular operators. Such network deployments are expected to provide high precision positioning based services.

SUMMARY

An example method for determining a neural network to provide a line of sight delay estimate according to the disclosure includes determining receiver configuration information or dynamic channel state information for a mobile device, determining neural network information based on the receiver configuration information or the channel state information, and providing the neural network information to the mobile device.

Implementations of such a method may include one or more of the following features. The receiver configuration information may include an antenna configuration. The antenna configuration may include a phase coherence state of the antenna configuration. The channel state information may include a power delay profile. The receiver configuration information may include an operating frequency and bandwidth. The neural network information may be stored on a network server. The neural network information may be stored on the mobile device. The neural network information may include an architecture of the neural network and its weight and bias matrices. The weight and bias values may be truncated to reduce a complexity of the neural network information.

An example method for determining a line of sight delay, an angle of arrival, or an angle of departure value, according to the disclosure includes receiving reference signal information, determining a channel frequency response or a channel impulse response based on the reference signal information, processing the channel frequency response or the channel impulse response with a neural network, and determining the line of sight delay, the angle of arrival, or the angle of departure value based on an output of the neural network.

Implementations of such a method may include one or more of the following features. The reference signal information may be a sounding reference signal. The reference signal information may be a positioning reference signal. The reference signal information may be a channel state information reference signal. The neural network may be determined based at least in part of a positioning method used for determining a location of a mobile device. Determining the neural network may be based at least in part on a receiver configuration. The receiver configuration may include an antenna configuration and a phase coherence state of the antenna configuration. Determining the neural network may include transmitting the neural network information from a network to a mobile device. Determining the neural network may include transmitting an indication of a selected neural network from a list of neural networks available at a mobile device. The neural network may be one of a plurality of neural networks stored in a data structure. A required desired accuracy associated with the output of the neural network may be determined, and one or more weights in the neural network may be adapted based on the required desired accuracy. The output of the neural network includes a quality estimate. Determining the line of sight delay, the angle of arrival, or the angle of departure value may be based at least in part on the quality estimate.

An example apparatus for determining a neural network to provide a line of sight delay estimate according to the disclosure includes a memory, at least one transceiver, at least one processor operably coupled to the memory and the at least one transceiver, and configured to determine receiver configuration information or dynamic channel state information for a mobile device, determine neural network information based on the receiver configuration information or the channel state information, and provide the neural network information to the mobile device.

Implementations of such an apparatus may include one or more of the following features. The receiver configuration information may include an antenna configuration. The antenna configuration may include a phase coherence state of the antenna configuration. The channel state information may include a power delay profile. The receiver configuration information may include an operating frequency and bandwidth. The neural network information may be stored on a network server. The neural network information may be stored on the mobile device. The neural network information may include an architecture of the neural network and its weight and bias matrices. The at least one processor may be further configured to truncate the weight and bias values to reduce a complexity of the neural network information.

An example apparatus for determining a line of sight delay, an angle of arrival, or an angle of departure value, according to the disclosure includes a memory, at least one processor operably coupled to the memory and configured to receive reference signal information, determine a channel frequency response or a channel impulse response based on the reference signal information, process the channel frequency response or the channel impulse response with a neural network, and determine the line of sight delay, the angle of arrival, or the angle of departure value based on an output of the neural network.

Implementations of such an apparatus may include one or more of the following features. The reference signal information may be a sounding reference signal. The reference signal information may be a positioning reference signal. The reference signal information may be a channel state information reference signal. The at least one processor may be further configured to determine the neural network based at least in part of a positioning method used to determine a location of a mobile device. The at least one processor may be further configured to determine the neural network based at least in part on a receiver configuration. The receiver configuration may include an antenna configuration and a phase coherence state of the antenna configuration. The apparatus may include at least one transceiver operably coupled to the memory and the at least one processor, such that the at least one processor may be further configured to transmit the neural network information from a network to a mobile device. The at least one processor may be further configured to transmit an indication of a selected neural network from a list of neural networks available at a mobile device. The neural network may be one of a plurality of neural networks stored in a data structure. The at least one processor may be further configured to determine a required desired accuracy associated with the line of sight delay and adapt one or more weights in the neural network based on the required desired accuracy. The output of the neural network may include a quality estimate. The at least one processor may be further configured to determine the line of sight delay, the angle of arrival, or the angle of departure value based at least in part on the quality estimate.

An example apparatus for determining a neural network to provide a line of sight delay estimate according to the disclosure includes means for determining receiver configuration information or dynamic channel state information for a mobile device, means for determining neural network information based on the receiver configuration information or the channel state information, and means for providing the neural network information to the mobile device.

An example apparatus for determining a line of sight delay, an angle of arrival, or an angle of departure value according to the disclosure includes means for receiving reference signal information, means for determining a channel frequency response or a channel impulse response based on the reference signal information, means for processing the channel frequency response or the channel impulse response with a neural network, and means for determining the line of sight delay, the angle of arrival, or the angle of departure value based on an output of the neural network.

An example non-transitory processor-readable storage medium comprising processor-readable instructions configured to cause one or more processors to determine a neural network to provide a line of sight delay estimate according to the disclosure includes code for determining receiver configuration information or dynamic channel state information for a mobile device, code for determining neural network information based on the receiver configuration information or the channel state information, and code for providing the neural network information to the mobile device.

An example non-transitory processor-readable storage medium comprising processor-readable instructions configured to cause one or more processors to determine a line of sight delay, an angle of arrival, or an angle of departure value according to the disclosure includes code for receiving reference signal information, code for determining a channel frequency response or a channel impulse response based on the reference signal information, code for processing the channel frequency response or the channel impulse response with a neural network, and code for determining the line of sight delay, the angle of arrival, or the angle of departure value based on an output of the neural network.

Items and/or techniques described herein may provide one or more of the following capabilities, as well as other capabilities not mentioned. The configuration of a receive chain may be determined. The configuration may include an antenna element configuration and phase coherence state. A neural network may be selected based on the configuration information. A channel impulse response may be input into the neural network. A line of sight delay estimate may be output from the neural network. The line of sight delay estimate may be used in positioning methods. Other capabilities may be provided and not every implementation according to the disclosure must provide any, let alone all, of the capabilities discussed.

DETAILED DESCRIPTION

Techniques are discussed herein for neural network based positioning of a mobile device. For example, the disclosure addresses the problem of accurate line-of-sight (LOS) delay estimation in a wireless channel using deep neural networks (NN), which can be used as a building block to derive accurate position estimates. A NN may be used to exploit the properties of the wireless channel to estimate a LOS delay. The proposed NN shows improved performance in the presence of weak LOS signals and dense multipath, which are typically challenging scenarios for traditional signal processing algorithms. These techniques and configurations are examples, and other techniques and configurations may be used.

In general, positioning methods may be classified into two categories: (1) Geometric/parametric methods including intermediate parameters such as time of arrival (ToA), time difference of arrival (TDoA), angle of arrival & departure (AoA/AoD), round trip time (RTT) are first computed and then input to a measurement model to derive the final location estimate, and (2) Non-parametric methods which learn the "similarity" between the measurements at known locations and use this information to predict the location given a new set of measurements. The methods disclosed herein compute intermediate parameters for positioning, specifically estimating the LOS delay of a signal arriving from a transmitter to a receiver, which translates to a distance estimate between the two devices. The term 'LOS delay' as used herein is a generic term to also imply the first arriving path of the channel, which in some scenarios may not be the physical line of sight path.

Figure 1:
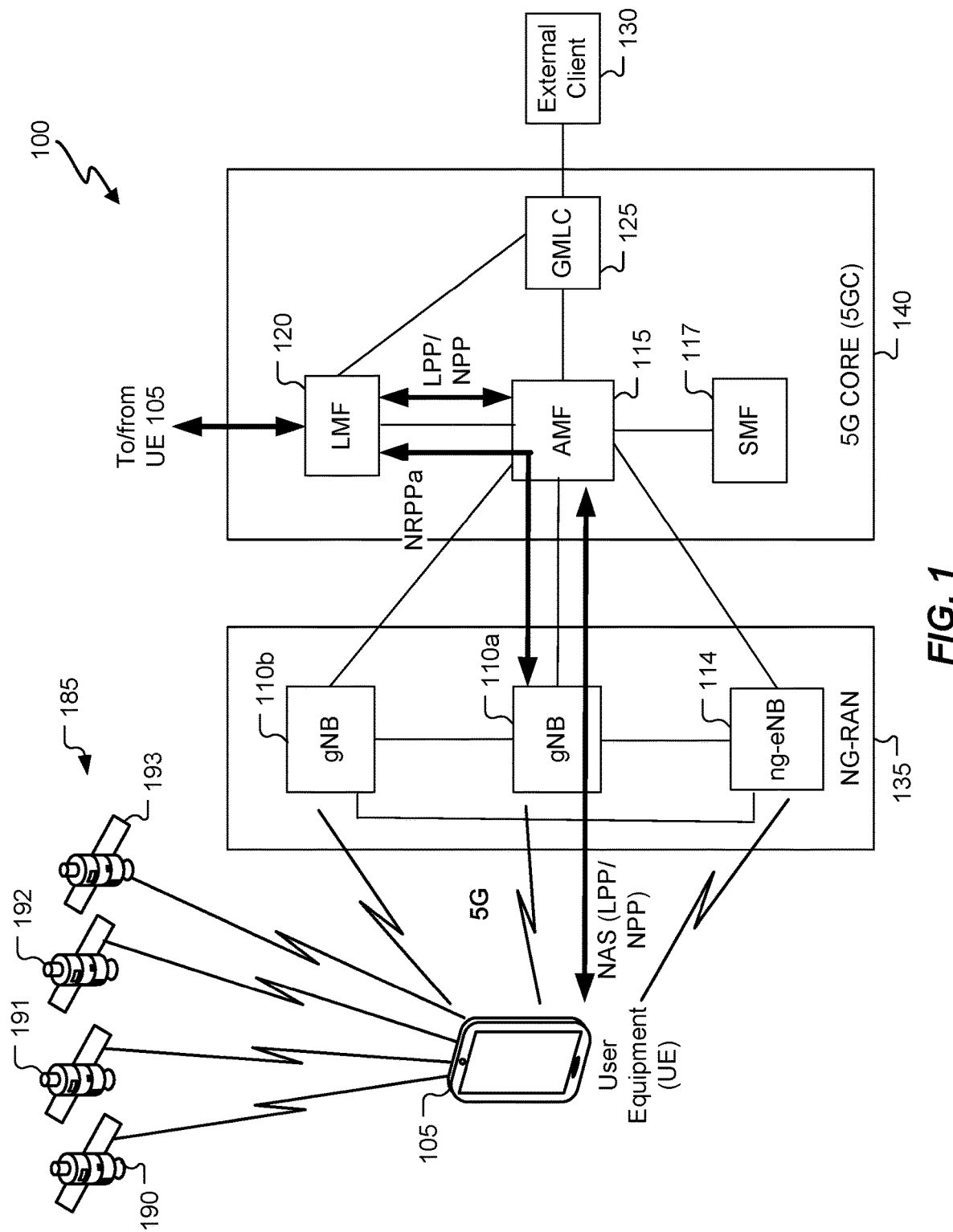
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
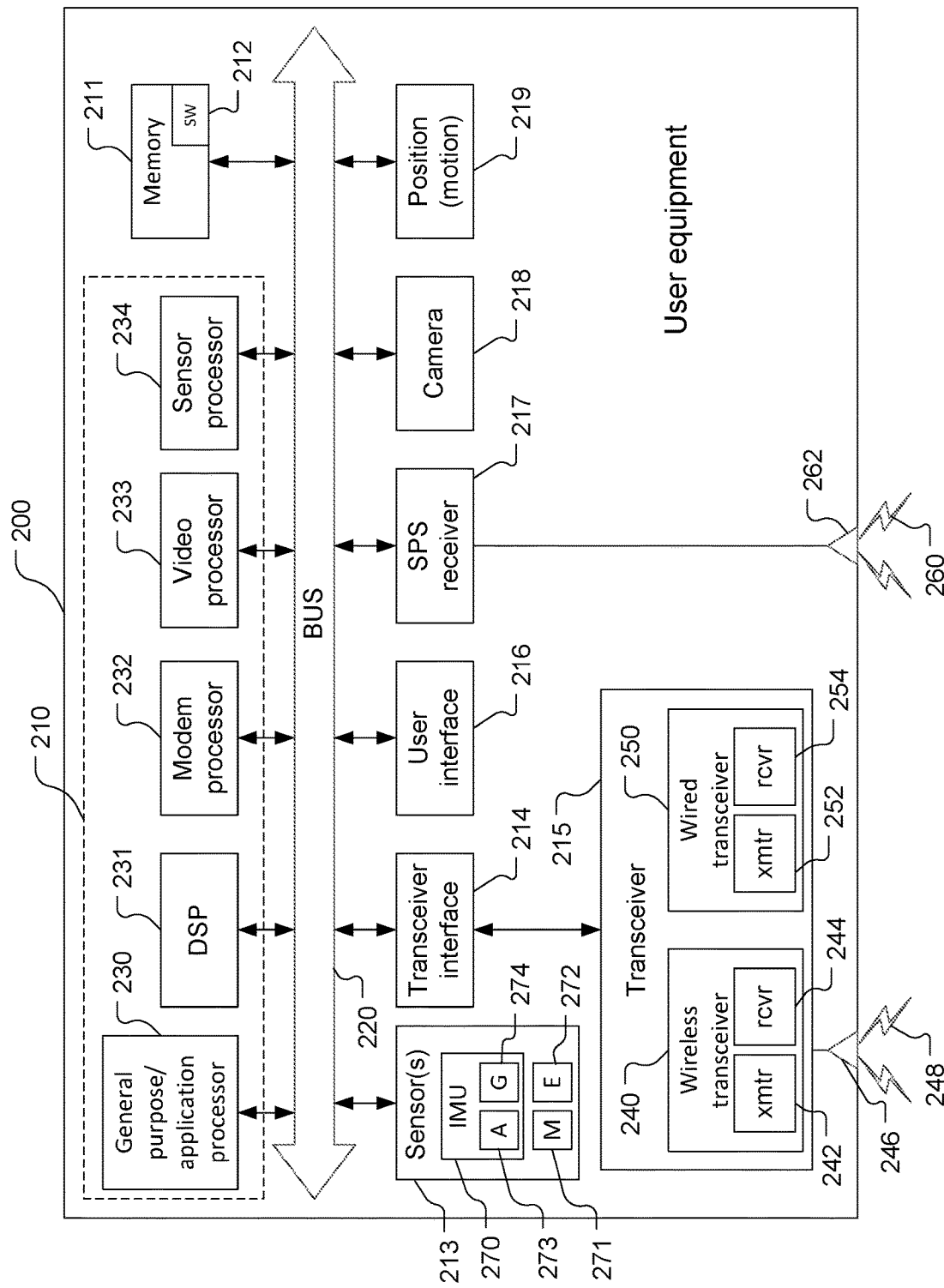
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
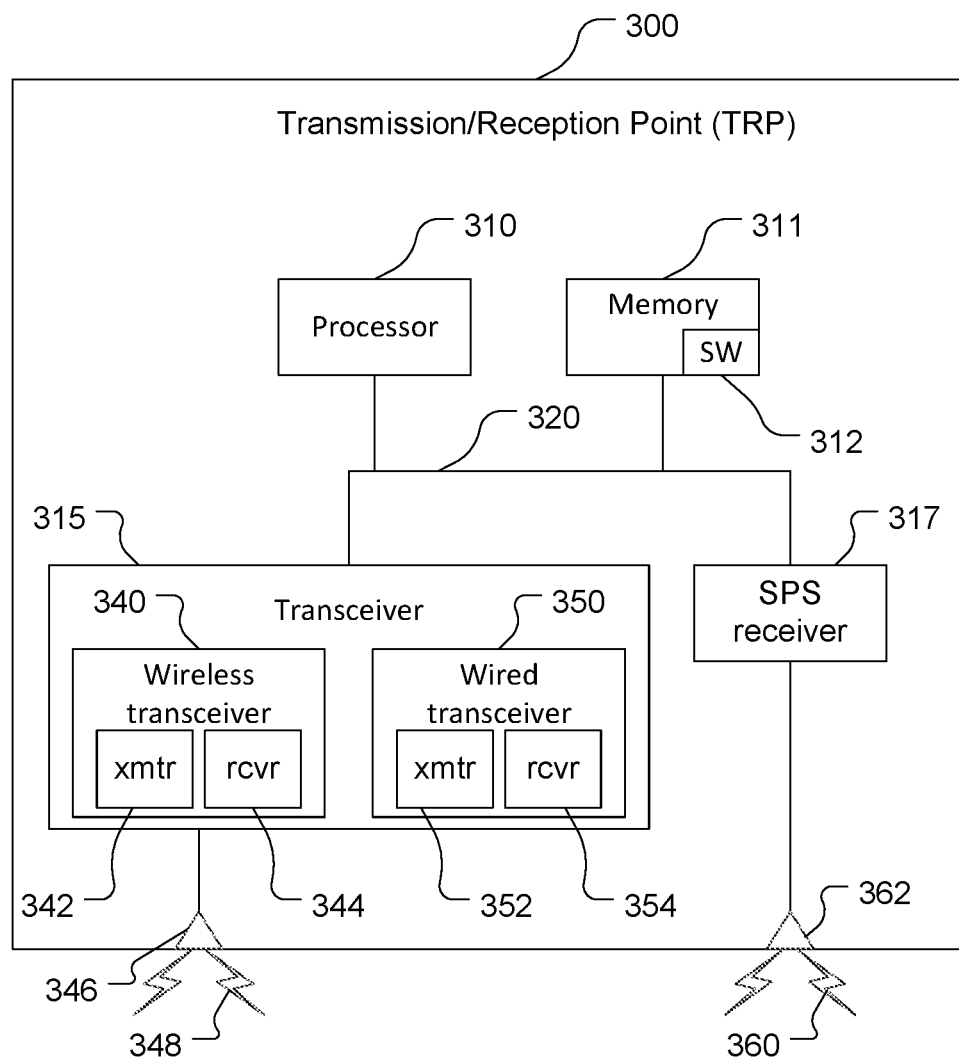
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by a server and/or the UE 200 (i.e., the LMF 120 and/or the UE 200 may be configured to perform one or more of these functions).

Figure 4:
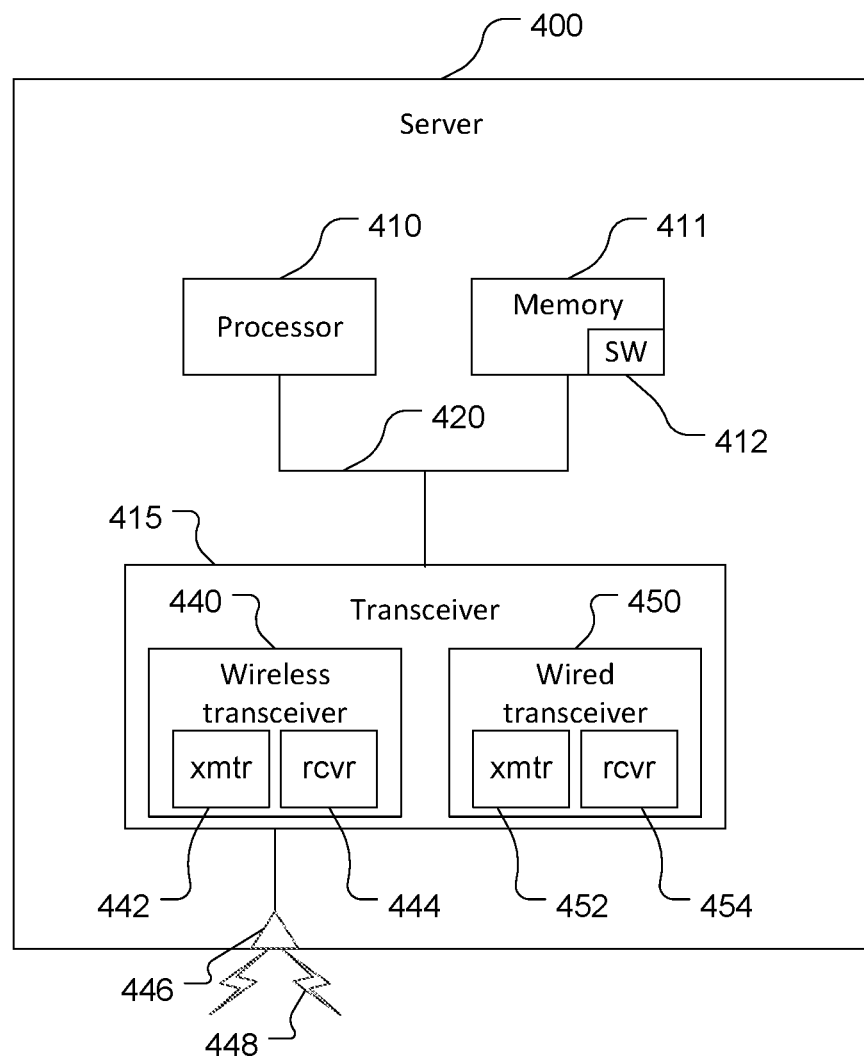
FIG. 4 is a block diagram of components of an example server shown in FIG. 1.

Referring also to FIG. 4, an example of a server 400 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

One or more of many different techniques may be used to determine position of an entity such as the UE 105. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

Figure 5:
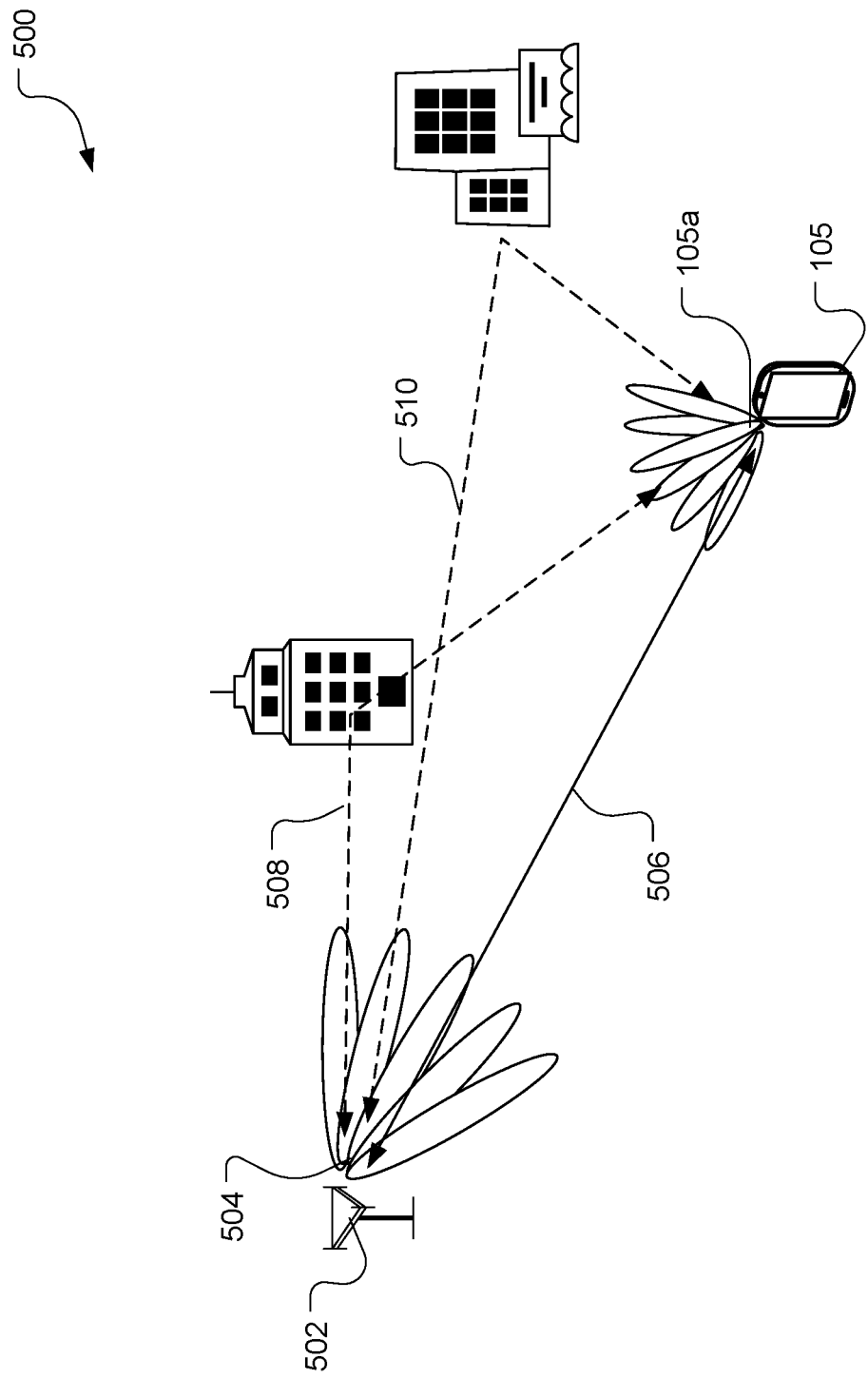
FIG. 5 is a conceptual diagram of an example line of sight between a base station and a mobile device.

Referring to FIG. 5, with further reference to FIGS. 1-4, a conceptual diagram 500 of an example line of sight between a base station 502 and a mobile device (e.g., the UE 105) is shown. The base station may be a TRP 300 such as the eNB 110a. The base station 502 may be configured with beam forming technology to generate a plurality of transmit and/or receive beams 504. The UE 105 may be a 5G NR mobile device with beam forming features and configured to generate a plurality of transmit and/or receive beams 105a. In an example, the base station 502 and the UE 105 may be configured for full duplex operation such that the respective transceivers 340, 240 are configured to transmit and receive simultaneously. The diagram 500 includes a simplified multipath scenario where the base station 502 and the UE 105 may communicate with one another via a LOS path 506 or one or more non-LOS (NLOS) paths such as a first NLOS path 508 and a second NOS path 510. The LOS and NLOS paths 506, 508, 510 may be based on one or more transmit beams generated by the base station 502 and the UE 105. For example, a wide transmit beam transmitted by the base station 502 may reach the UE 105 via the LOS path 506 as well as via one or more of the NLOS paths 508, 510. While the NLOS paths 508, 510 may be adequate for communication, the additional distance traveled between the base station 502 and the UE 105 may reduce the accuracy of the distance/position estimate for the UE 105. Weak LOS paths may also impact the accuracy of the position distance estimate.

Figure 6:
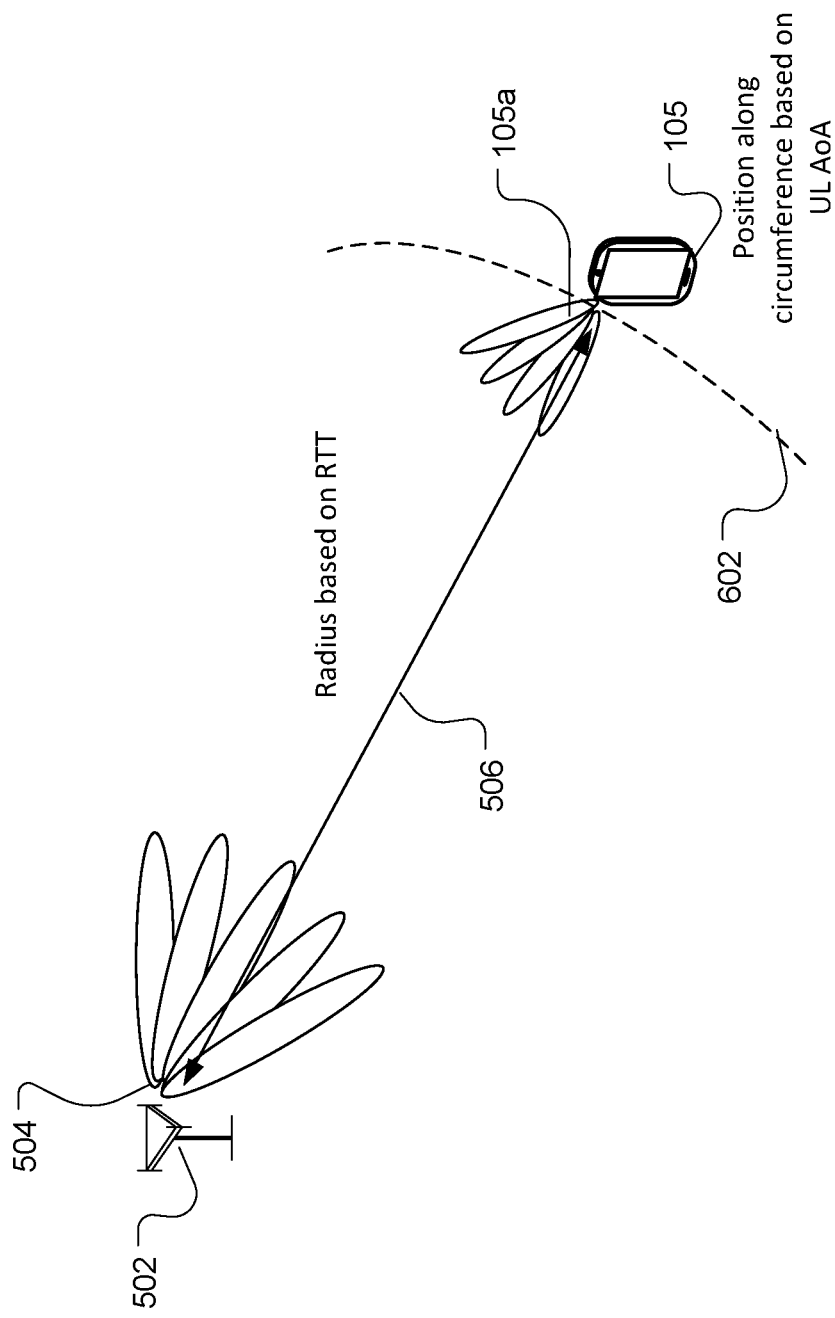
FIG. 6 is a conceptual diagram of an example position determination based on a line of sight signal.

Referring to FIG. 6, with further reference to FIG. 5, a conceptual diagram of an example position determination based on a line of sight signal is shown. LOS delay estimation is the first step in positioning for several methods such as ToA, TDoA and RTT based methods. For example, the LOS delay associated with the LOS path 506 may be used to determine a radius of a circle 602 around the base station 502. The position of the UE 105 along the circumference of the circle 602 may be based on uplink (UL) angle of arrival (AoA) measured by the base station 502. The NN based estimator described herein provides improved LOS delay estimation for a variety of weak LOS and multipath scenarios as compared to conventional algorithms such as Matrix Pencil delay estimation and Threshold peak detection and interpolation.

In an OFDM system with a subcarrier spacing $\Delta f$ and K subcarriers, the system bandwidth (BW) is then B=K$\Delta f$. The channel frequency response (CFR) between two nodes such as the base station 502 and the UE 105 may be expressed as:

$$H_k = \sum_{m=0}^{M-1} \alpha_m e^{-j2\pi k \Delta f \tau_m} + w_k \quad (1)$$

where,
$\Delta f$=subcarrier spacing;
k=number of subcarriers;
M=number of channel paths;
$(\sigma_m, \tau_m)$, m=0, 1, . . . , M−1=the path gains and delays of the channel from the transmitter to the receiver; and
$H_k$=CFR (i.e., channel gain) on the $k^{th}$ subcarrier.

The constant $w_k$ is modeled is an added white Gaussian noise (AWGN) with variance $E[|w_k|^2]=\sigma^2$. The average channel power is normalized such that $\Sigma_{m=0}^{M-1} E[|\alpha_m|]^2=1$, and signal to noise ratio is defined as SNR=1/$\sigma^2$. The objective in LOS estimation is to determine the value of $\tau 0$, the delay of the first arriving path in the channel impulse response (CIR). Historically, accurate estimation of $\tau 0$ has been challenging in weak LOS path and multipath scenarios.

Figure 7:
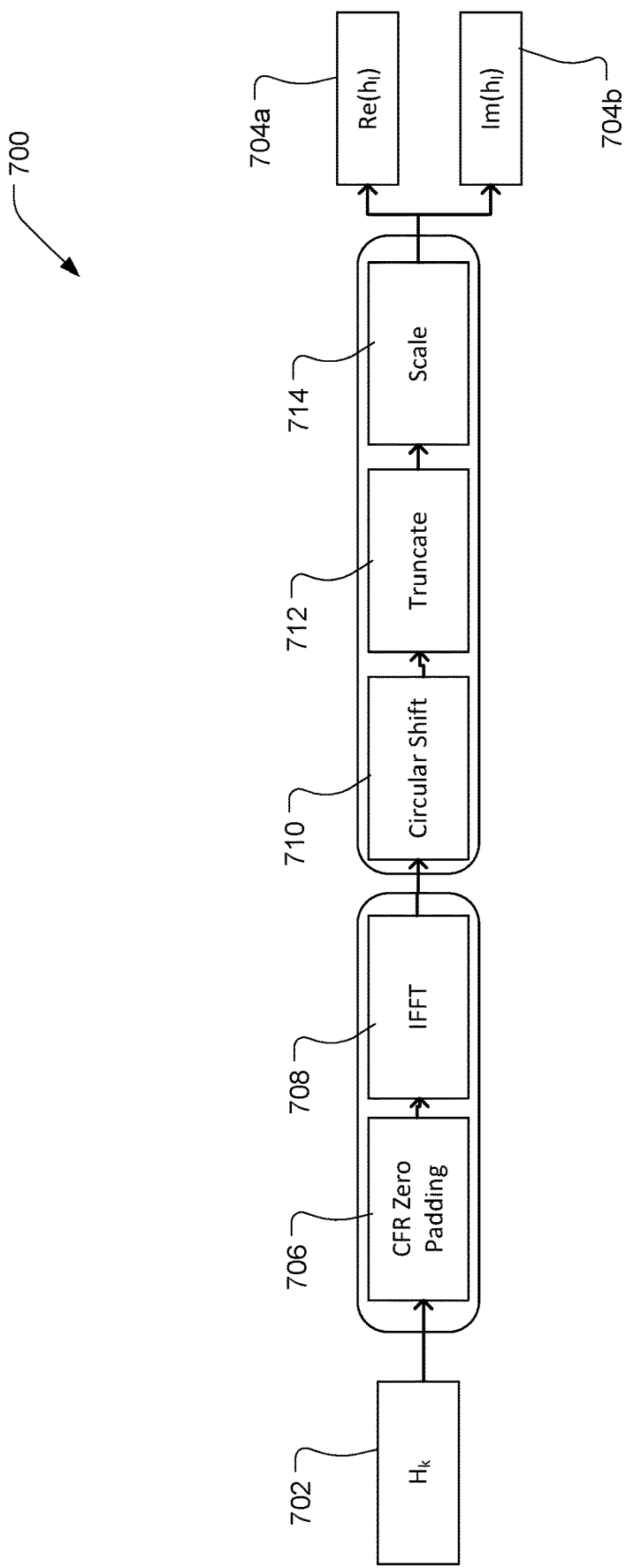
FIG. 7 is a flow diagram of an example process for generating a channel impulse response input for a neural network.

Referring to FIG. 7, a flow diagram of an example process 700 for generating a channel impulse response input for a neural network is shown. The process 700 receives the CFR (i.e., Hi, as described above) at stage 702. The CIR output of the process 700 is composed of complex numbers including a real part 704a and an imaginary part 704b. In an example, the magnitude of the CIR may be utilized and may improve the overall performance of the NN. An oversampling process may be used to smooth the band-limited impulse response (e.g., 1× to 4×) and improve the delay estimation. The oversampled CIR may be generated by zero-padding the CFR to the right length at stage 706 and then performing a large point Inverse Fast-Fourier Transform (IFFT) at stage 708. In an embodiment, the process may optionally perform one or more shift, scaling and truncation operations to reduce the NN input complexity. In general, in realistic channels, a large fraction of the energy in the CIR is contained within a few time-domain samples. This may be used to reduce the input complexity by shifting the CIR at stage 710 and/or truncating the oversampled CIR to capture most of the input energy of the channel. For example, if the LOS delay is very close to zero, a part of the CIR peak is wrapped around due to the IFFT operation at stage 708. In this example, the CIR is artificially delayed by a few samples to enable the LOS path to be captured within the truncation window at stage 712. The input features to the NN may also be scaled at stage 714 such that the peak of the CIR magnitude is unity. The preprocessing may be used to homogenize the CIR from various physical scenarios to enable processing with a single NN.

In an example, if the LOS path is very weak and the next significant arriving path has a large delay compared to the LOS path, the CIR truncation procedure may miss the LOS path. In this case, additional samples in the CIR truncation window may be utilized to reduce the probability of missing a weak LOS path.

The disclosed NN may be configured to individually process the CIR from each transmit-receive antenna pair and the output delay from all the antenna pairs may be combined in postprocessing. A motivation behind this choice is that spatial correlation among the antennas is a strong function of the devices' antenna layout and that such information may not be readily available to the devices in a commercial network (e.g., assuming a uniform linear or planar array is not a realistic option, especially in small cells). Also, if the positioning signals are transmitted from a mixture of macro and small cells, they would have different antenna configurations. Single Input Single Output (SISO) processing allows the trained NN to be reused across a wider range of antenna architectures.

Figure 8:
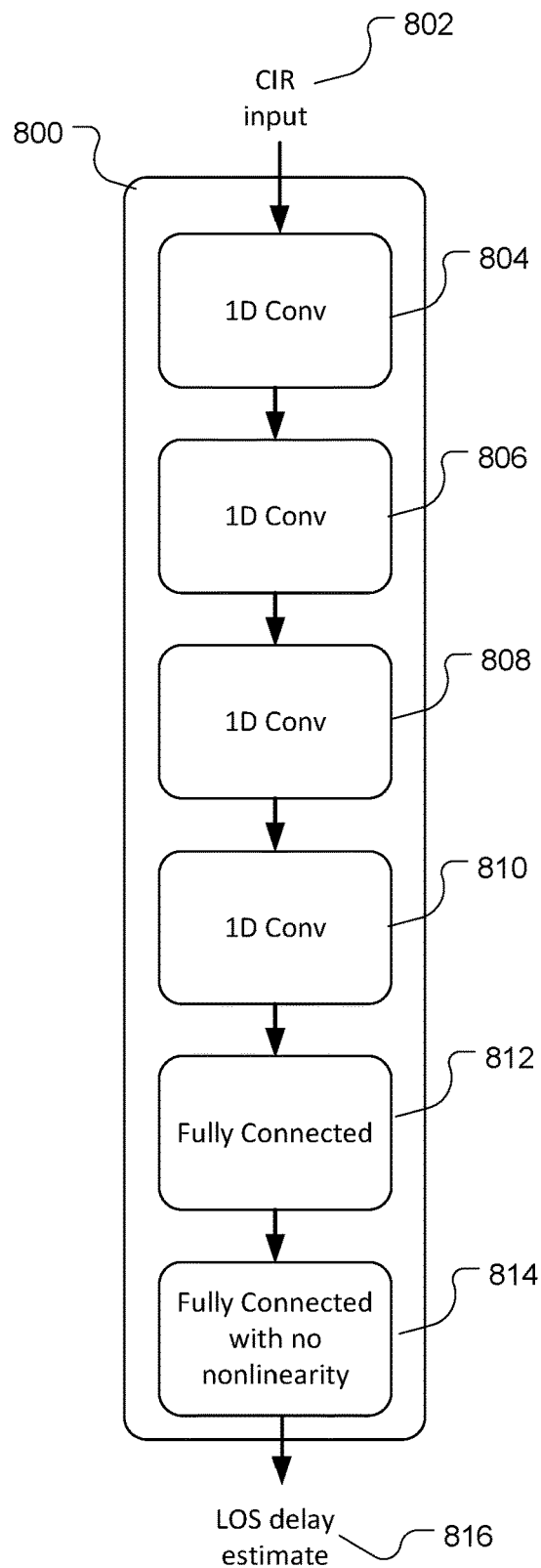
FIG. 8 is a block diagram of an example neural network for determining a line of sight delay estimate.

Referring to FIG. 8, with further reference to FIG. 7, a block diagram of an example neural network (NN) 800 for determining a line of sight delay estimate 816 is shown. The CIR input 802 (i.e., the real and imaginary parts 704a-b in FIG. 7) are used as the input to the NN 800. In general, a delayed input CIR 802 should result in an equivalently delayed value of the estimated LOS path delay 816. A plurality of 1D convolutional layers 804, 806, 808, 810 may be used to capture the delay translation property between the input and output (i.e., a translation equivariance in delay domain). In an example, the CFR may be used directly as an input to the NN 800. In this example, each path delay may correspond to a linear phase ramp in the frequency domain and the CFR is the weighted sum of all such linear phase ramps. The path with the unwrapped phase slope of the lowest magnitude corresponds to the first arrival path. Extracting this information from processing the frequency domain coefficients may require additional processing capabilities. The example discussed herein utilizes the CIR computed in FIG. 7 as an input to the NN 800.

Figure 9B:
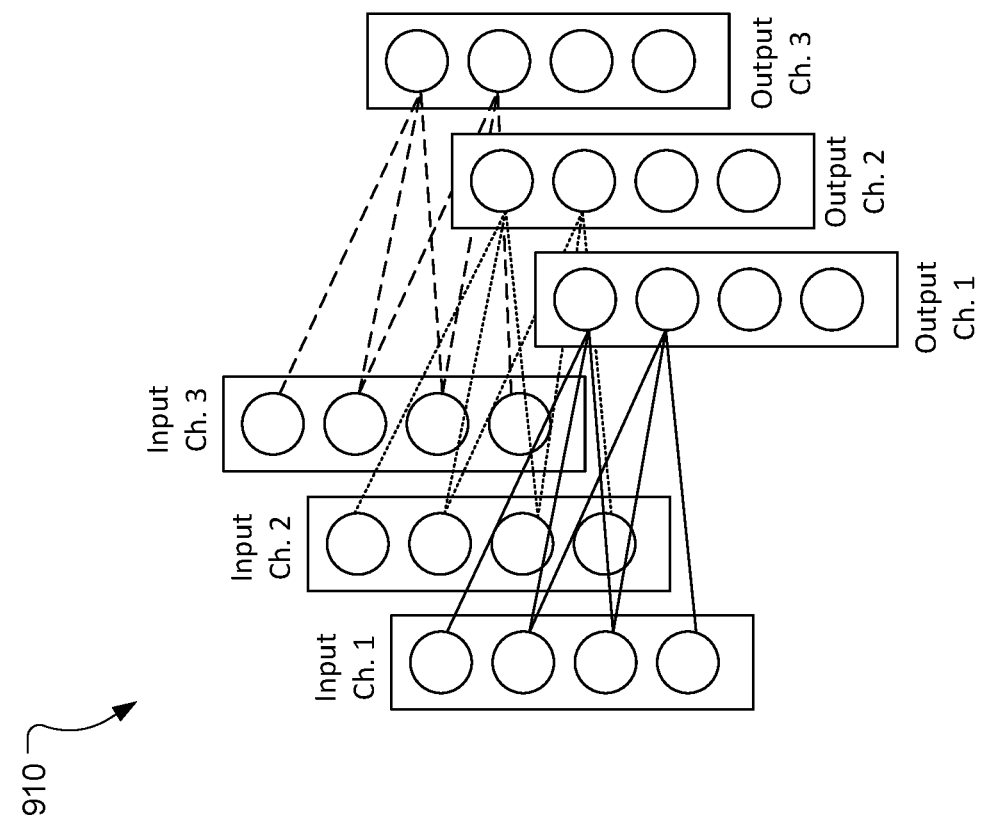
FIG. 9B is a block diagram of an example depth wise convolution layer in a neural network.
Figure 9A:
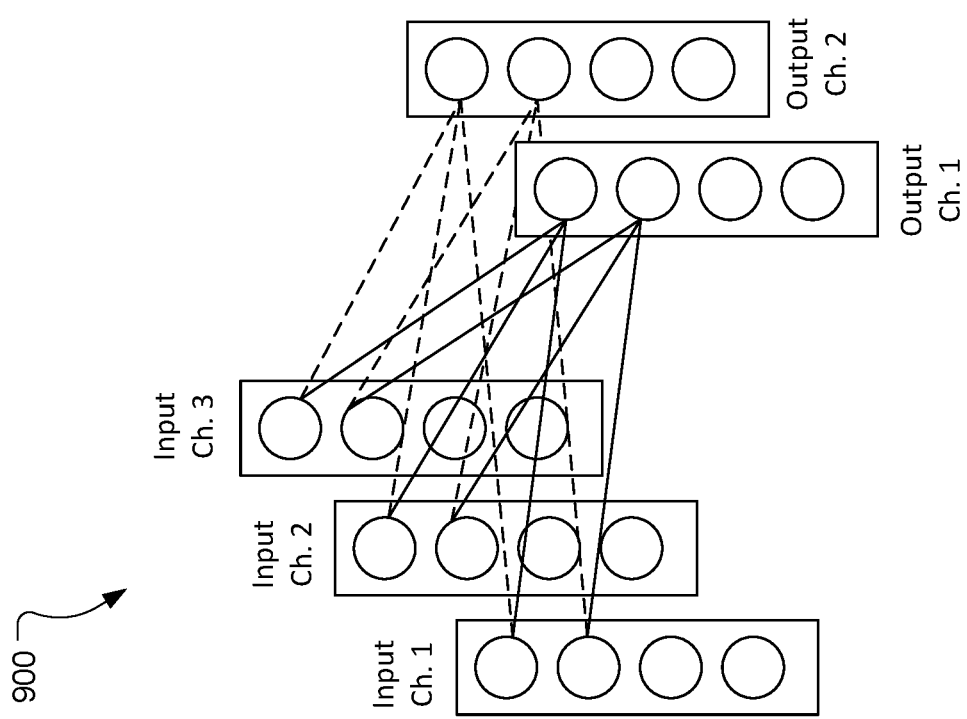
FIG. 9A is a block diagram of an example pointwise convolution layer in a neural network.

In an example, the architecture for the NN 800 exploits the translation equivariance between the input and the desired output. The NN 800 includes four convolutional layers 804, 806, 808, 810, followed by two fully connected layers 812, 814. Referring to FIGS. 9A and 9B, the convolutional layers 804, 806, 808, 810, may utilize one or more of a pointwise convolution layer 900 and/or a depth wise convolution layer 910. The pointwise convolution layer 900 is configured to combine across channels, and the depth wise convolution layer 910 is configured to combine within a channel In an example, a depth wise separable convolutional layer is used rather than a fully convolutional layer for each of the input convolutional layers. The use of separable convolutional layers may reduce the complexity and the number of weights significantly in the NN 800 without significantly degrading performance. A standard leaky rectified linear unit (ReLU) with leakage factor for negative input values may be used as the non-linearity for all layers except the last fully connected layer 814. In an example, max-pooling and batch-normalization may be used after the convolutional layers.

In an example, each train/test data point may be generated using a 4-step procedure including sampling from dataset parameters, generating a power delay profile (PDP), generating channel gain and delay, and generate a CFR. The hyper-parameters of the channel are first generated from Table 1.

TABLE 1

| Param. Name | DataSet A | DataSet B | Distribution |
|---|---|---|---|
| LOS Delay (ns) | 0-128 | 0-40 | Uniform |
| Num. Paths | 2-15 | 2-7 | Uniform |
| Delay Spread (ns) | 0-128 | 0-48 | Uniform |
| Rician Factor (linear) | 0.05-2 | 0.05-2 | Uniform |
| Per path power decay (dB) | 2-4 | 2-4 | Uniform |
| SNR (dB) | 5-30 | 5-30 | Uniform |

For example, for dataset A, an LOS delay is uniformly chosen between [0, 128] ns, the number of channel paths uniformly from $\{2, 3, \ldots, 15\}$ and so on. Using the channel hyper-parameters in the previous step, a channel PDP may be generated and normalized such that sum power of all the paths in the PDP including the LOS path is unity. The LOS path may be assigned a uniform phase between [0, $2\pi$] and a complex Gaussian number with the specified power is drawn for each NLOS path in the PDP as its path gain. A corresponding delay is assigned to each path. The channel gains and delays are then combined with the scenario description in Table 2 to generate the CFR and is stored as one sample in the database. The delay of the first arriving path is stored as the ground truth measurement for training the network.

and may translated to distance error in centimeters to enable an easy comparison across scenarios.

While the NN 800 includes the CIR as an input, the NN 800 may be trained based on other inputs. For example, the magnitude of the impulse response (i.e., abs(CIR)), an angle of the CIR and transformation of the angle (e.g., sin, cos) may be used as inputs. Other features may also be used such as logarithmic functions (e.g., log(abs(CIR)), scale factor after normalization, signal-to-noise (SNR) estimates of the CFR or CIR. Other signal related parameters may also be used in the NN 800. The NN 800 may also be augmented with pooling and batch normalization layers based on complexity/performance requirements. Some connections may be skipped in large networks. In an example, the output of the NN 800 may include a quality estimate to indicate confidence in the output. The quality estimate may be based on a variance or a standard deviation of the delay. Other features of the NN 800 may be modified to impact performance and accuracy parameters. For example, weights may be truncated (e.g., bit length or otherwise) to reduce complexity and match desired accuracy. A network may indicate a desired accuracy to the UE and the UE may be configured to adapt the NN weights accordingly.

While the output 816 in FIG. 8 indicates a LOS delay estimate, the NN 800 architecture may be adapted for other inputs such as angle of arrival (AoA) and/or angle of departure (AoD) estimates.

Figure 10:
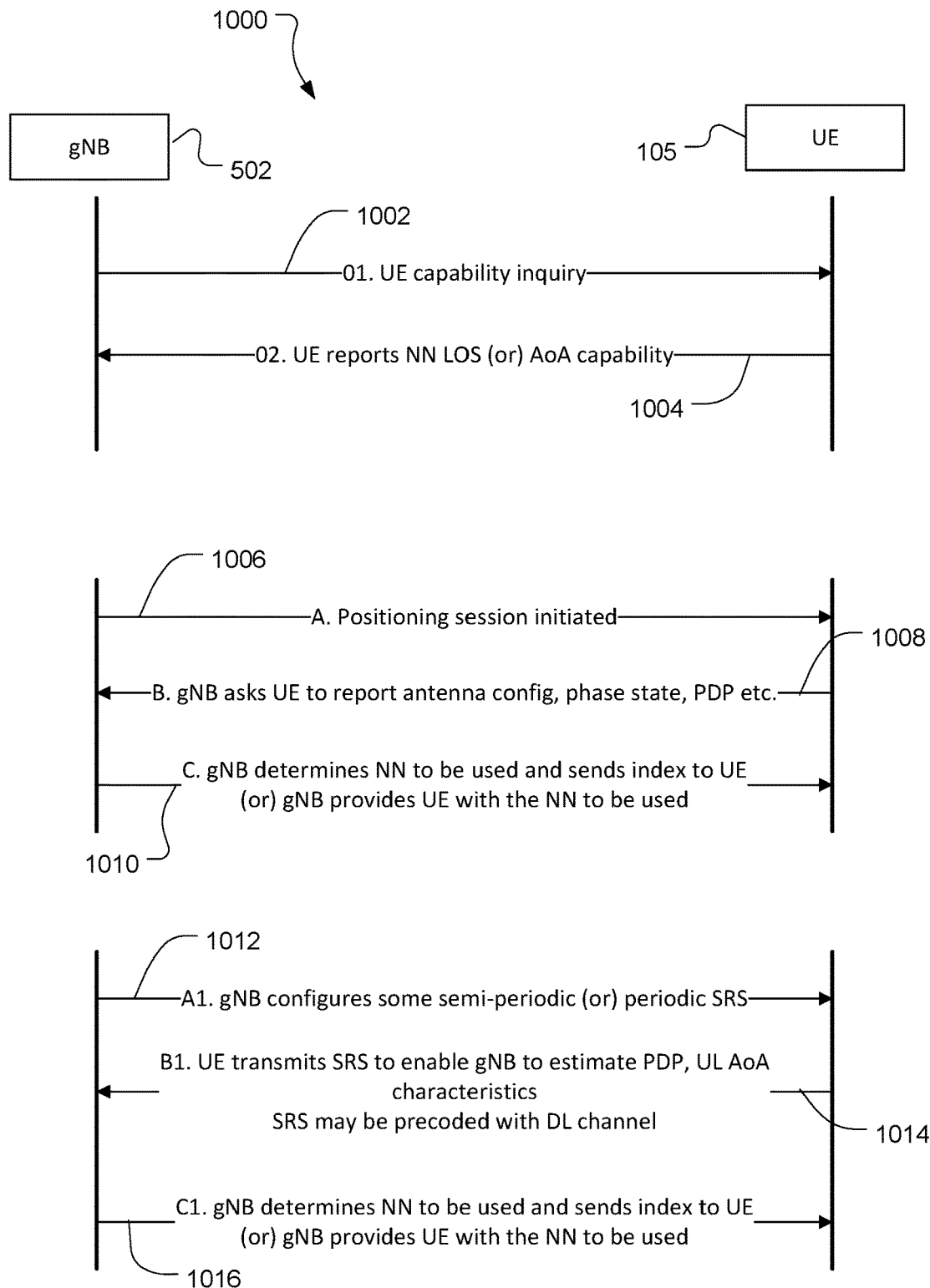
FIG. 10 includes example message flows between a base station and a mobile device for determining neural network information.

Referring to FIG. 10, with further reference to FIGS. 1-8, example message flows 1000 between a base station 502 and a mobile device (e.g., UE 105) are shown. The message flows 1000 may be based on existing or modified communication protocols such as NPP or NRPP. In an example the messages may be included in other protocol specifications such as radio resource control (RRC). In an example, a base station 502 may be configured to send a UE capability message 1002 to ascertain the capabilities to provide an LOS delay estimate based on a neural network. The UE 105 may be configured to respond with NN network information (e.g., based on configuration) and/or Angle of Arrival capabilities in a NN report message 1004. In an example, the base station 502 may initiate a positioning session with the UE 105 by transmitting a positioning initiation message 1006. The UE 105 may be configured to respond with a configuration response message 1008 including configuration information associated with a NN to use. For example,

TABLE 2

| Scenario | SCS (kHz) | BW (MHz) | # SCs (K) | OFDM FFT Size | OS Factor | Sample $T_S$ (ns) | CIR Window | Dataset |
|---|---|---|---|---|---|---|---|---|
| 1 | 30 | 100 | 3276 | 4096 | 4 | 2.03 | 256 | A |
| 2 | 30 | 200 | 3276 * 2 | 4096 * 2 | 2 | 2.03 | 256 | A |
| 3 | 30 | 400 | 3276 * 4 | 4096 * 4 | 1 | 2.03 | 256 | A |
| 4 | 60 | 400 | 3276 * 2 | 4096 * 2 | 1 | 2.03 | 256 | A |
| 5 | 120 | 400 | 3276 | 4096 | 1 | 2.03 | 256 | A |
| 6 | 30 | 400 | 3276 * 4 | 4096 * 4 | 4 | 0.507 | 256 | B |
| 7 | 30 | Equal mixture of samples from scenarios 1, 2 and 3. | | | | | | |

The NN weights may be trained independently for each scenario in Table 2 using an Adam optimizer. For each scenario, an adaptive learning rate schedule may be used. For example, the schedule may start with 10-3 and then drop to 10-4 and 10-5 at 25 and 50 epochs respectively. Training may be observed to converge at this learning rate and the entire network may be trained for 60 epochs, where each epoch runs through all the training examples in batches of 50. The average training and test loss is recorded per epoch the configuration information may include the UE antenna configuration, phase state PDP, or other information the base station may use to select a NN to use for estimating the LOS delay. In response to receiving the configuration response message 1008, the base station 502 may determine a NN to use and provide the corresponding NN information (e.g., model/algorithm) to the UE 105 in one or more NN information messages 1010. In an example, the UE 105 may be configured with a plurality of local NN information and the base station 502 may provide an index to indicate which local NN information to use in the NN information messages 1010.

In an example, the base station 502 may provide one or more messages (e.g., RRC, SIB, MAC) to configure semi-periodic or periodic Sounding Reference Signals (SRS) in a SRS configuration message 1012. The UE 105 may be configured to transmit SRS 1014 to enable the base station 502 to estimate PDP and UL AoA characteristics. The SRS may be precoded with downlink (DL) channel information. In response to receiving the SRS 1014, the base station 502 may determine a NN to use and provide the corresponding NN information (e.g., model/algorithm or local index) to the UE 105 in one or more NN information messages 1016.

Figure 11:
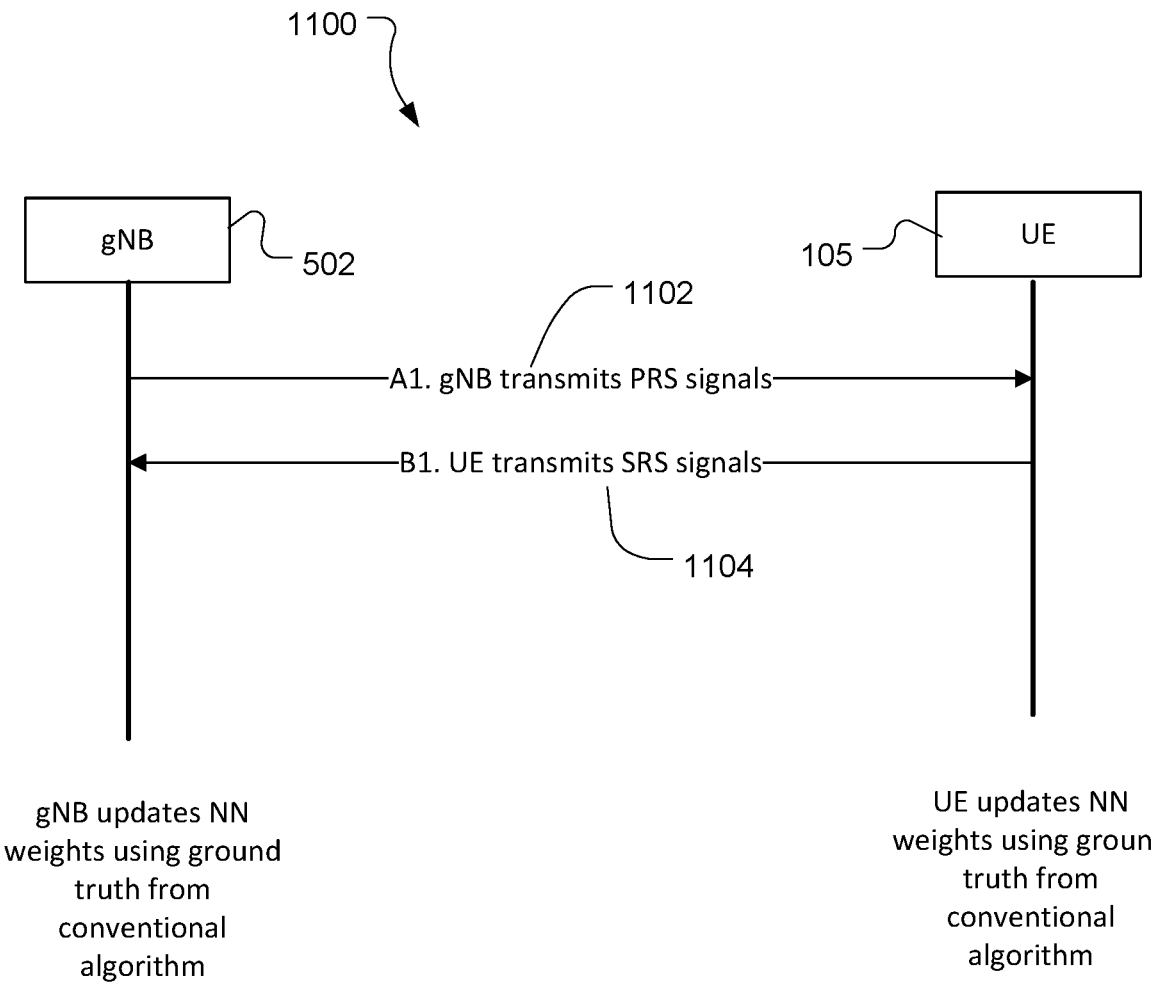
FIG. 11 includes example message flows between a base station and a mobile device for retraining a neural network.

Referring to FIG. 11, with further reference to FIGS. 1-10, example message flows 1100 between a base station 502 and a mobile device (e.g., the UE 105) for retraining a neural network (NN) are shown. The NN 800 may include a plurality of nodes and weighted inputs to the nodes. Reference signals such as PRS and SRS provide information about the combined effect of multipath fading, scattering, doppler and power losses in transmitted signals. The information given by the PRS and SRS signals may be used for online retraining of NN weights in the NN 800. For example, the base station 502 may generate and transmit PRS signals 1102. The UE 105 may be configured to update NN weights in the local NN information using the ground truth of the previously stored conventional algorithm. Similarly, the UE 105 may generate and transmit SRS signals 1104. The base station 502, or other associated network servers such as the LMF 120, may be configured to update NN weights using the ground truth from the previously stored conventional algorithm. The retraining procedure may be used to adapt the NN 800 to an environment, RF filters on the base station 502 and/or the UE 105, or other RF distortions that may impact the performance of the NN 800.

Figure 12:
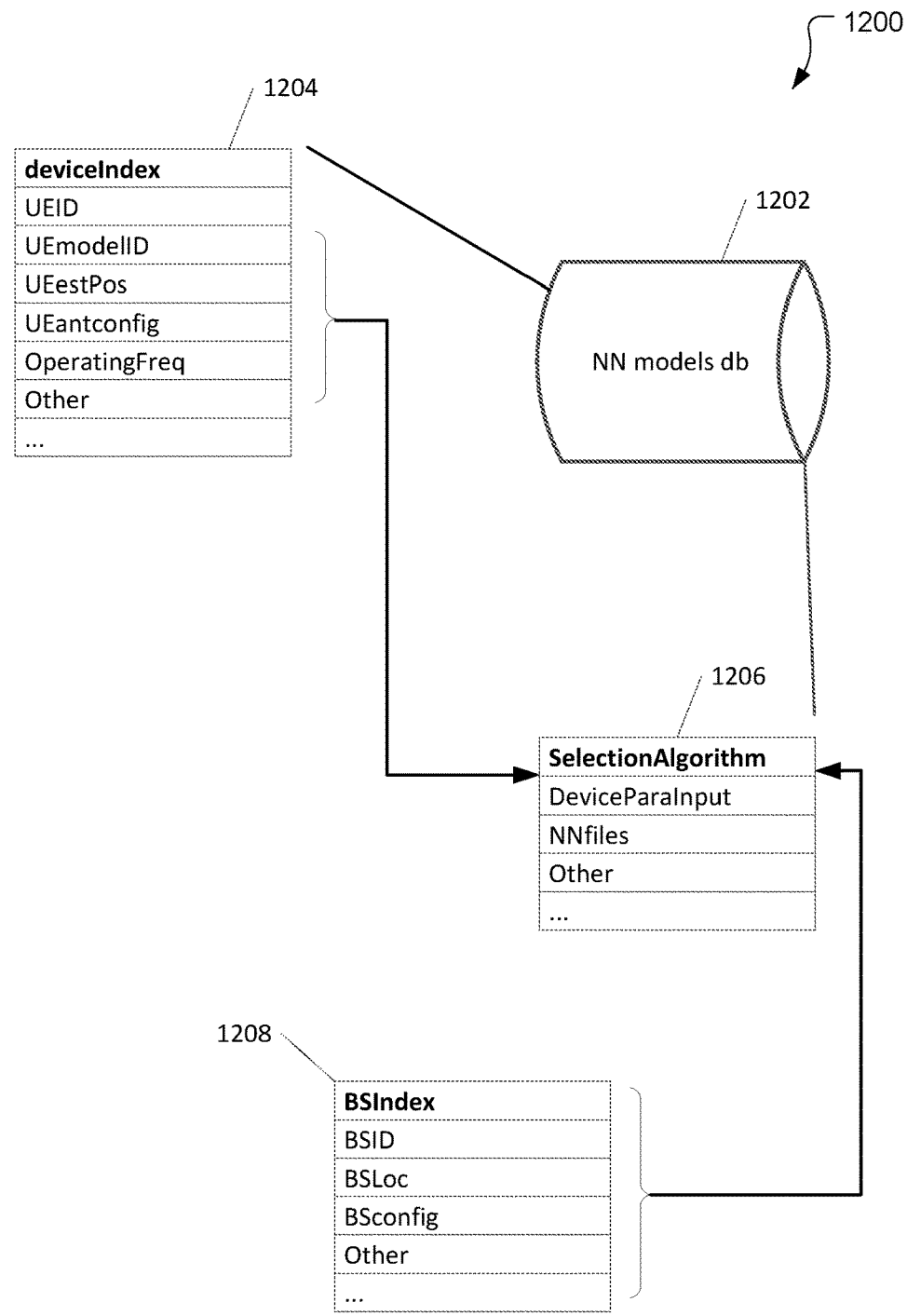
FIG. 12 is an example data structure for neural network models.

Referring to FIG. 12, with further reference to FIGS. 1-11, an example data structure 1200 for neural network models is shown. The data structure 1200 may include one or more data bases 1202 including one or more data tables such as a device table 1204, an algorithm table 1206 and a base station table 1208. The data structure 1200 may include relational database applications (e.g., Oracle, SQL, dBase, etc.), flat files (e.g., JSON, XML, CVS), binary files, or other file structures configured to persist and index neural network models. The data structure 1200 may include other instructions such as stored procedures configured to query, update, append and index the tables in the data base 1202. In general, neural network information may include architectures, weights and bias matrices associated with the neurons in a neural network. In an example, the neural network information may persist in a data structure such that an executing neural network may utilize the data structure to process an input. In an example, the neural network may comprise a executable file (e.g., compiled) which includes the architectures, weights and bias matrices. The device table 1204 may include fields associated with a mobile device and the channel state which may be used to select an appropriate neural network. For example, the device table 1204 may include a UEID field to identify a particular UE and/or a UEmodelID field to identify the product and model information of the UE. The UEmodelID field may be associated with antenna configurations and other form factors which can be associated with a NN. The antenna configuration may indicate a layout and a phase coherence state of the antennas (e.g., fully, partially, non-coherent). A UEestPos field may identify the current or historical estimated positions of the UE. The estimated location of the UE may be used to select a NN to use for LOS delay estimation. For example, different NNs may be used for different environments and specific locations (e.g., indoor, urban, factory floor, mall, office, etc.). An OperatingFreq field may be used to indicate the frequencies and/or channel information the UE is configured to operate on. Other fields may also be used to characterize the channel state and/or the configuration of a UE. One or more of the fields in the device table 1204 may be used to select NN files from the algorithm table 1206. In an example, the records in the algorithm table 1206 may include architecture, weight, bias matrices, etc. for NNs trained based on the parameters stored in the device table 1204 and/or the base station table 1208. In an example, the algorithm table 1206 may include binary files (e.g., compiled programs) which include a complete NN capable of receiving a CIR input and outputting a LOS delay estimate as depicted in FIG. 8. The base station table 1208 may include fields associated with the operational parameters of a base station. For example, a BSID field may indicate a unique ID of a base station, a BSLoc field may indicate the location of the base station, and a BSconfig field may indicate configuration details of the base station such as antenna configurations and orientations. For example, the configuration information may include other fields associated with a cell such as the number of antennas, phase coherence, spatial structure, operating frequency, antenna spacing, layout, used set of elements, etc. These fields are examples only and not limitations as other fields may be used to categorize base stations and associated cells. The records in the base station table 1208 may be associated with one or more NN records in the algorithm table 1206.

The fields and tables described in the data structure 1200 are examples only. The data structure may be constructed to enable a device, such as a network server (e.g. the server 400, LMF 120, etc.) or a UE to associate configuration and operational parameters with one or more neural networks. Thus, a neural network may be selected based on the configuration of the UE, the configuration of a base station, or other combinations of network resources and operational parameters (e.g., proximity of neighbors, time of day, device density, network traffic, etc.). In an example, a positioning method (e.g., RTT, ToA, TDoA, etc.) may be used to select a neural network.

Figure 13A:
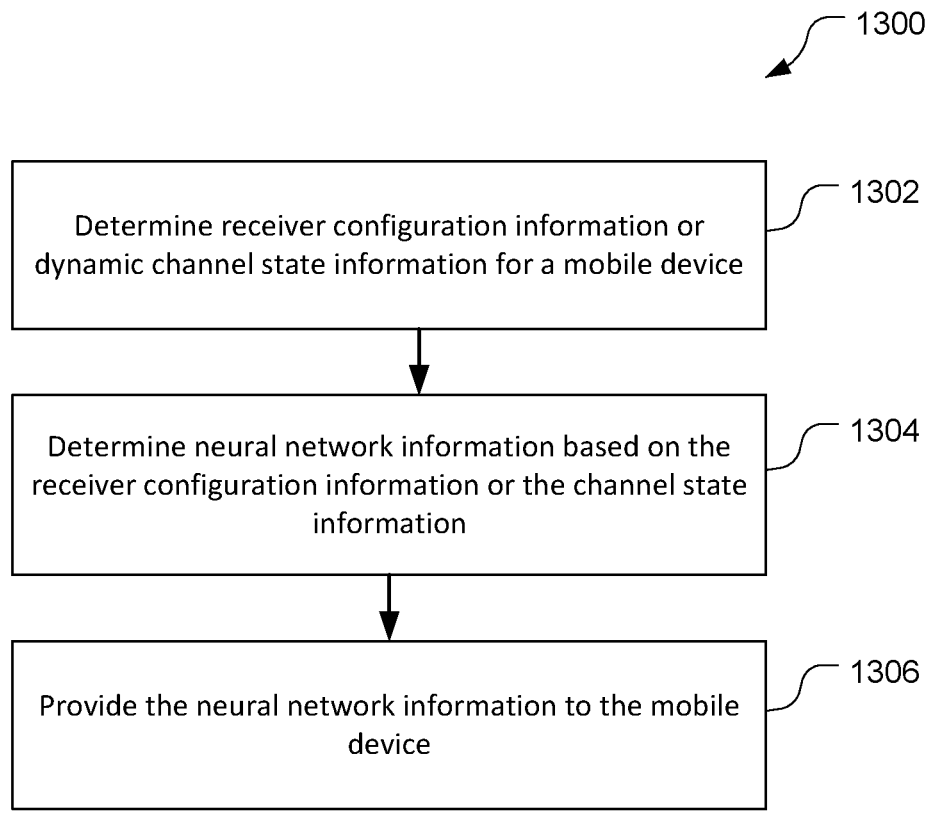
FIG. 13A is a process flow diagram for an example method for providing neural network information to a mobile device.

Referring to FIG. 13A, with further reference to FIGS. 1-12, a method 1300 of providing neural network information to a mobile device includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes determining receiver configuration information or channel state information for a mobile device. A server 400 and the transceiver 415, or a UE 200 may be a means for determining receiver configuration or channel state. In an example, referring to FIG. 10, a base station 502 may initiate a positioning session and the UE 105 may be configured to provide configuration response messages 1008 including the receiver configuration information. The receive configuration information may also be transceiver configuration information based on the capabilities of a device (i.e., a transceiver may include a combination of receiver and transmitter components). In an example, the UE 200 may include local configuration information stored in the memory 211 and/or detectable by the processor 230. In an example, the receiver configuration may indicate antenna configuration (e.g., layout) and the phase coherence state of antennas. For example, fully coherent (i.e., phase aligned combining at multiple receive antennas), partially coherent (i.e., subsets of antenna elements are phase aligned), or non-coherent (i.e., no phase alignment across antenna elements). The receiver configuration information may define a state of the UE and may include physical and electrical configuration and associated channel state information such as antenna configuration, phase state, PDP, or other variables that are associated with channel state and the receive chain in the UE 200.

At stage 1304, the method includes determining neural network information based on the receiver configuration information or the channel state information. A server 400 or a UE 200 may be a means for determining neural network information. Referring to FIG. 12, a server 400 and/or a UE 200 may include one or more elements of the data structure 1200. The receiver configuration information determined at stage 1302 may correspond to one or more records in the device table 1204. The data base 1202 may be queried based on the receiver configuration or channel state to determine one or more records in the algorithm table 1206. The records in the algorithm table 1206 may include neural network data such as architecture, weight, bias matrices, etc. associated with distributed neural network algorithms. In an example, the neural network information may be adjusted based on a PDP received from the UE. The neural network information may be a index number associated with a list of neural networks stored locally on the UE. The UE 200 may be configured to determine the neural network information locally without assistance from the network. In an example, the server 400 or the UE 200 may be configured to utilize SNR or other environmental inputs to dynamically determine whether to use the NN 800 or conventional algorithms to compute the LOS delay estimate. For example, conventional algorithms may be a more efficient option in low SNR (e.g., clear view) environments, and a neural network solution may be used for high SNR environments.

At stage 1306, the method includes providing the neural network information to the mobile device. The server 400 and the transceiver 415, or a UE 200 may be a means for providing the neural network information. The base station 502 may be configured to send a NN information message 1010 including the neural network information determined at stage 1304. In an example, the NN information message 1010 may include neural network data such as architecture, weight, bias matrices, etc. In an example, the neural network message may include an executable file or an index associated with neural network information stored locally on the UE. In an example, providing the neural network information may include providing the information locally from the memory 211 to the processor 230 within the UE 200.

The method 1300 may include one or more of the following features. The receiver configuration information may include an antenna configuration, and the antenna configuration may include a phase coherence state of the antenna configuration. The channel state information may include a power delay profile. The receiver configuration information may include an operating frequency and bandwidth. The neural network information may be stored on a network server and/or on the mobile device. The neural network information may include an architecture of the neural network and its weight and bias matrices. The weight and bias values may be truncated to reduce a complexity of the neural network information.

Figure 13B:
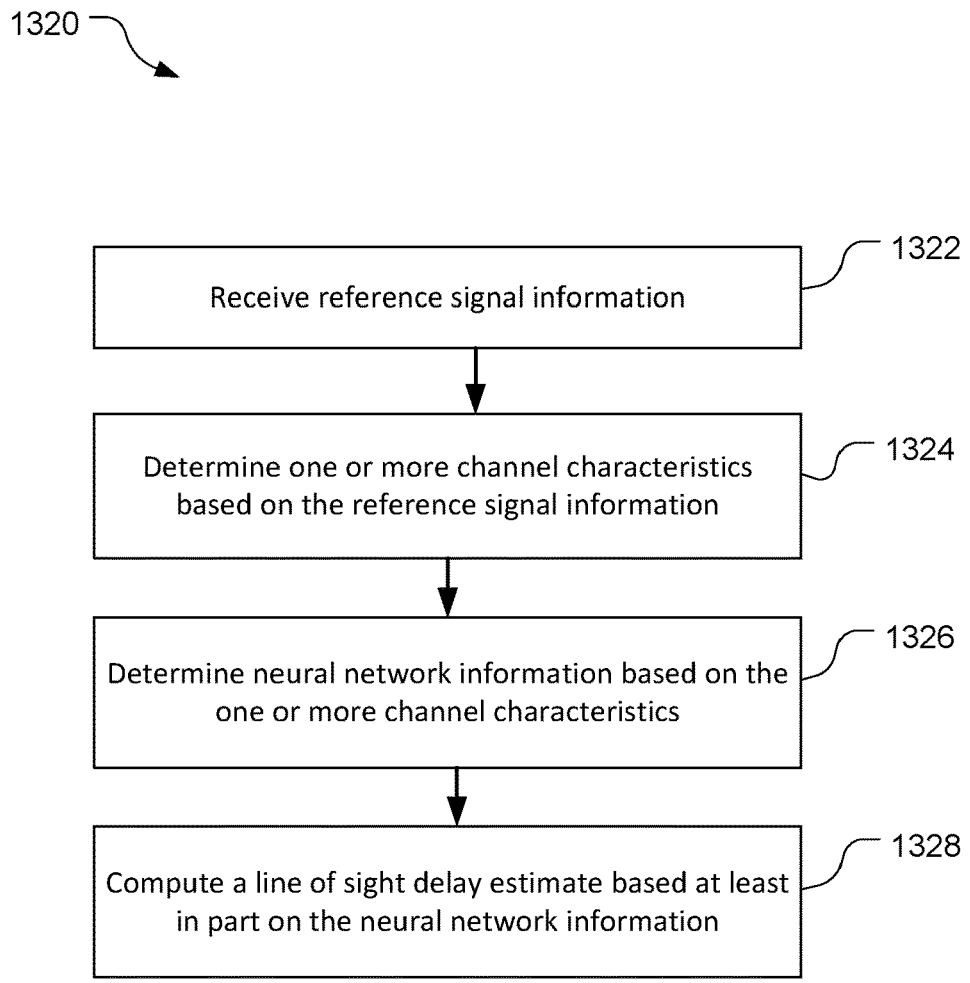
FIG. 13B is a process flow diagram for an example method for computing a line of sight delay based on neural network information.

Referring to FIG. 13B, with further reference to FIGS. 1-12, a method 1320 of computing a line of sight delay based on neural network information includes the stages shown. The method 1320 is, however, an example only and not limiting. The method 1320 may be altered, e.g., by having stages added, removed, rearranged, combined, performed concurrently, and/or having single stages split into multiple stages.

At stage 1322, the method includes receiving reference signal information. The transceiver 340 or the transceiver 240 may be means for receiving reference signal information. In an example, a TRP 300 may receive SRS signals from the UE 200. In another example, the UE 200 may receive PRS signals from the TRP 300. Other reference signals such as CSI-RS and DMRS may be used as reference signals which may be received by either the TRP 300 or the UE 200.

At stage 1324, the method includes determining one or more channel characteristics based on the reference signal information. The processor 310 or the processor 230 may be a means for determining the one or more channel characteristics. The reference signal information may be used to determine information about the combined effect of multipath fading, scattering, doppler and power losses in transmitted signals. In an example, the UE 200 or the TRP 300 may determine a PDP value and a channel frequency response based on the reference signal information. The channel frequency response may be computed based on equation (1).

At stage 1326, the method includes determining neural network information based on the one or more channel characteristics. The TRP 300 and the UE 200 may be means for determining neural network information. In an example, the TRP 300 may receive the SRS signals from the UE 200 and determine the PDP based on the SRS signals. The PDP value may be used to select neural network information from the data structure 1200. Other configuration information may be used to select the neural network information. In an example, the UE 200 may be configured to determine a PDP based on the PRS signals received from the TRP 300. The UE 200 may provide the PDP information, and other configuration information, to the TRP 300 via a configuration response message 1008, and the TRP may determine the neural network information. The UE 200 may determine the neural network information locally based in part on the PDP value.

At stage 1328, the method includes computing a line of sight delay estimate based at least in part on the neural network information. The processor 310 or the processor 230 may be a means for computing the line of sight delay. The TRP 300 or the UE 200 may determine CIR values based on the CFR determined at stage 1324. For example, the process 700 may be used to determine the CIR values. The CIR values may be input into the NN 800 to determine the line of sight delay estimate. The architecture, weight and bias matrices in the NN 800 are based on the neural network information determined at stage 1326. In an example, the NN 800 may be modified based on the PDP. The output of the NN 800 may include a quality estimate indicating a confidence in the delay estimate.

Figure 14:
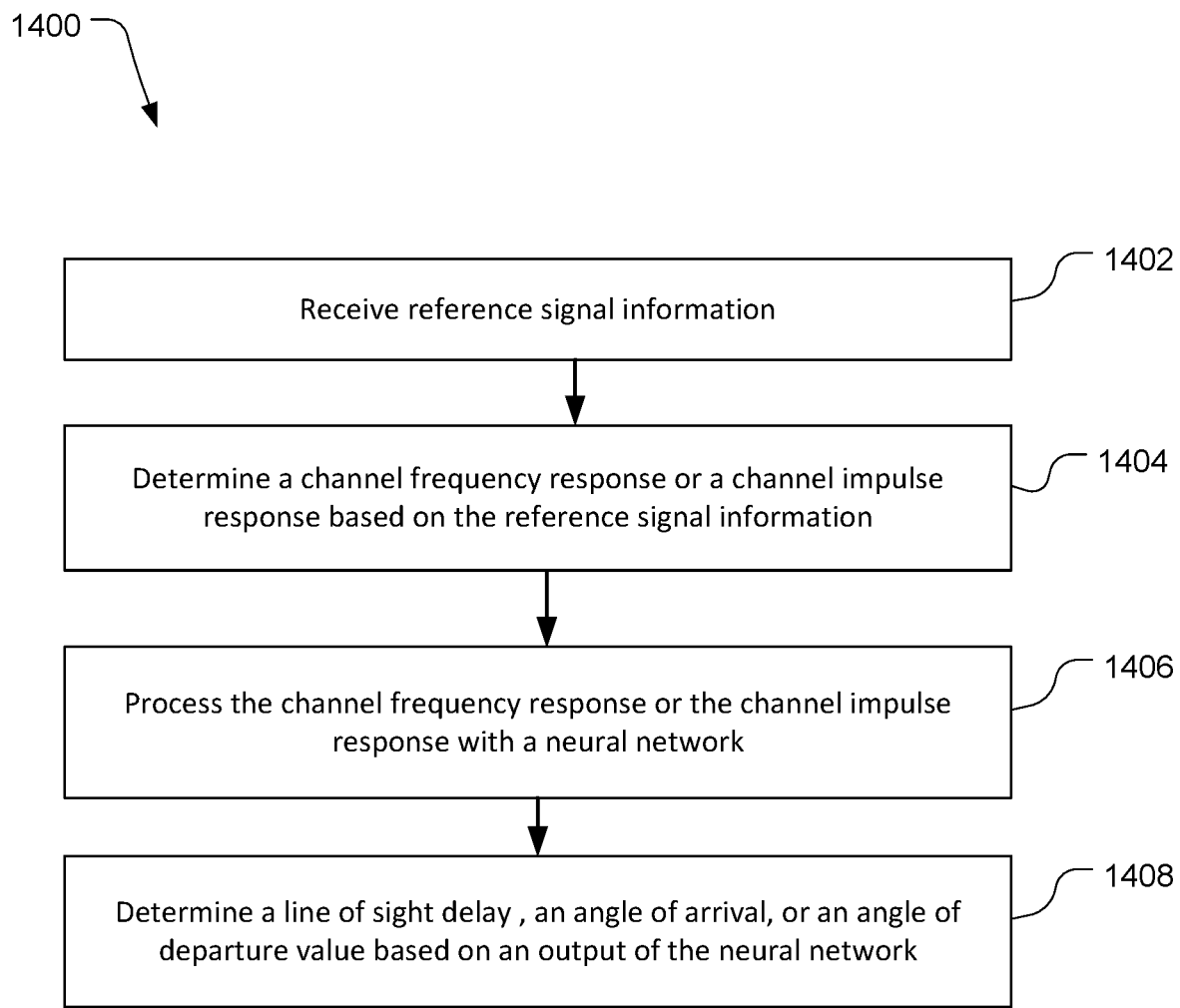
FIG. 14 is a process flow diagram of an example method for determining a line of sight delay.

Referring to FIG. 14, with further reference to FIGS. 1-12, a method 1400 for determining a line of sight delay includes the stages shown. The method 1400 is, however, an example only and not limiting. The method 1400 may be altered, e.g., by having stages added, removed, rearranged, combined, performed concurrently, and/or having single stages split into multiple stages.

At stage 1402, the method includes receiving reference signal information. The transceiver 340 or the transceiver 240 may be means for receiving reference signal information. In an example, a TRP 300 may receive SRS signals from the UE 200. In another example, the UE 200 may receive PRS signals from the TRP 300. Other reference signals such as CSI-RS and DMRS may be used as reference signals which may be received by either the TRP 300 or the UE 200.

At stage 1404, the method includes determining a channel frequency response or a channel impulse response based on the reference signal information. The processor 310 or the processor 230 may be a means for determining the channel frequency response (CFR) or the channel impulse response (CIR). The CFR between the TRP 300 and the UE 200 may be based on equation (1) described above. Referring to FIG. 7, determining the CIR includes determining a real part 704a of the CIR and an imaginary part 704b of the CIR.

At stage 1406, the method includes processing the channel frequency response or the channel impulse response with a neural network. The processor 310 or the processor 230 may be a means for processing the CIR. The neural network may be based on configuration information associated with the TRP 300 and/or the UE 200. For example, referring to FIG. 12, the data structure 1200 includes a plurality of neural networks based on the respective configurations of the TRP 300 and the UE 200. The neural network may be based on antenna configurations, including layout and phase coherence states of the antennas. Other physical, electrical and environmental parameters may be used to select a neural network.

At stage 1408, the method includes determining a line of sight delay, an angle of arrival, or an angle of departure value based on an output of the neural network. The processor 310 or the processor 230 may be a means for determining the output of the NN. The output 816 is based on the architecture and training of the NN 800. In an example, the output 816 may include a line of sight delay estimate. In other examples, the output 816 may include an angle of arrival estimate or an angle of departure estimate. The output 816 may also include a quality estimate. The quality estimate may be based on a variance or a standard deviation of the output 816. If the quality estimate is above a determined threshold, the weights of the NN 800 may be modified (e.g., based a PDP value), or another neural network from the data structure may be selected. A satisfactory line of sight delay estimate may be used in methods for positioning the UE 200 including RTT, ToA, and TDoA.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the server 400 may be performed outside of the server 400 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a line of sight delay, an angle of arrival, or an angle of departure value, comprising:
   receiving reference signal information;
   determining a channel frequency response or a channel impulse response based on the reference signal information;
   processing the channel frequency response or the channel impulse response with a neural network; and
   determining the line of sight delay, the angle of arrival, or the angle of departure value based on an output of the neural network.

2. The method of clause 1 wherein the reference signal information is a sounding reference signal.

3. The method of clause 1 wherein the reference signal information is a positioning reference signal.

4. The method of clause 1 wherein the reference signal information is a channel state information reference signal.

5. The method of clause 1 further comprising determining the neural network based at least in part of a positioning method used for determining a location of a mobile device.

6. The method of clause 5 further comprising determining the neural network based at least in part on a receiver configuration.

7. The method of clause 6 wherein the receiver configuration includes an antenna configuration and a phase coherence state of the antenna configuration.

8. The method of clause 5 wherein the determining the neural network includes transmitting neural network information from a network to the mobile device.

9. The method of clause 5 wherein determining the neural network includes transmitting an indication of a selected neural network from a list of neural networks available at the mobile device.

10. The method of clause 1 wherein the neural network is one of a plurality of neural networks stored in a data structure.

11. The method of clause 1 further comprising determining a required desired accuracy associated with the output of the neural network, and wherein processing the channel impulse response with the neural network includes adapting one or more weights in the neural network based on the required desired accuracy.

12. The method of clause 1 wherein the output of the neural network includes a quality estimate.

13. The method of clause 12 wherein determining the line of sight delay, the angle of arrival, or the angle of departure value is based at least in part on the quality estimate.

14. An apparatus for determining a line of sight delay, an angle of arrival, or an angle of departure value, comprising:
   a memory;
   at least one transceiver;
   at least one processor communicatively coupled to the memory and the at least one transceiver, and configured to:
   receive reference signal information;
   determine a channel frequency response or a channel impulse response based on the reference signal information;
   process the channel frequency response or the channel impulse response with a neural network; and
   determine the line of sight delay, the angle of arrival, or the angle of departure value based on an output of the neural network.

15. The apparatus of clause 14 wherein the reference signal information is a sounding reference signal.

16. The apparatus of clause 14 wherein the reference signal information is a positioning reference signal.

17. The apparatus of clause 14 wherein the reference signal information is a channel state information reference signal.

18. The apparatus of clause 14 wherein the at least one processor is further configured to determine the neural network based at least in part on a positioning method used to determine a location of a mobile device.

19. The apparatus of clause 18 wherein the at least one processor is further configured to determine the neural network based at least in part on a receiver configuration.

20. The apparatus of clause 19 wherein the receiver configuration includes an antenna configuration and a phase coherence state of the antenna configuration.

21. The apparatus of clause 14 wherein the at least one processor is further configured to transmit neural network information from a network to a mobile device.

22. The apparatus of clause 14 wherein the at least one processor is further configured to transmit an indication of a selected neural network from a list of neural networks available at a mobile device.

23. The apparatus of clause 14 wherein the neural network is one of a plurality of neural networks stored in a data structure.

24. The apparatus of clause 14 wherein the at least one processor is further configured to determine a required desired accuracy associated with the line of sight delay and adapt one or more weights in the neural network based on the required desired accuracy.

25. The apparatus of clause 14 wherein the output of the neural network includes a quality estimate.

26. The apparatus of clause 25 wherein the at least one processor is further configured to determine the line of sight delay, the angle of arrival, or the angle of departure value based at least in part on the quality estimate.

27. An apparatus for determining a line of sight delay, an angle of arrival, or an angle of departure value, comprising:
   means for receiving reference signal information;
   means for determining a channel frequency response or a channel impulse response based on the reference signal information;
   means for processing the channel frequency response or the channel impulse response with a neural network; and
   means for determining the line of sight delay, the angle of arrival, or the angle of departure value based on an output of the neural network.

28. The apparatus of clause 27 wherein the reference signal information is associated with at least one of a sounding reference signal, a positioning reference signal, or a channel state information reference signal.

29. A non-transitory processor-readable storage medium comprising processor-readable instructions configured to cause one or more processors to determine a line of sight delay, an angle of arrival, or an angle of departure value, comprising:
  code for receiving reference signal information;
  code for determining a channel frequency response or a channel impulse response based on the reference signal information;
  code for processing the channel frequency response or the channel impulse response with a neural network; and
  code for determining the line of sight delay, the angle of arrival, or the angle of departure value based on an output of the neural network.

30. The non-transitory processor-readable storage medium of clause 29 wherein the determining the neural network includes at least one of transmitting neural network information from a network to a mobile device, or transmitting an indication of a selected neural network from a list of neural networks available at the mobile device.

31. A method, performed on a mobile device, for determining a line of sight delay, an angle of arrival, or an angle of departure value, comprising:
  receiving reference signal information;
  determining a channel frequency response or a channel impulse response based on the reference signal information;
  processing the channel frequency response or the channel impulse response with a neural network; and
  determining the line of sight delay, the angle of arrival, or the angle of departure value based on an output of the neural network.

32. The method of clause 31 wherein the reference signal information is a positioning reference signal measurement.

33. The method of clause 31 further comprising determining the neural network based at least in part on a receiver configuration in the mobile device.

34. The method of clause 33 wherein the determining the neural network includes receiving neural network information from a network server.

35. The method of clause 33 wherein determining the neural network includes receiving an indication of a selected neural network from a list of neural networks available at the mobile device.

36. The method of clause 31 wherein the neural network is one of a plurality of neural networks stored in a data structure on the mobile device.

37. An apparatus for determining a line of sight delay, an angle of arrival, or an angle of departure value, comprising:
  a memory;
  at least one transceiver;
  at least one processor communicatively coupled to the memory and the at least one transceiver, and configured to:
  receive reference signal information;
  determine a channel frequency response or a channel impulse response based on the reference signal information;
  process the channel frequency response or the channel impulse response with a neural network; and
  determine the line of sight delay, the angle of arrival, or the angle of departure value based on an output of the neural network.

38. The apparatus of clause 37 wherein the reference signal information is a positioning reference signal measurement.

39. The apparatus of clause 37 wherein the at least one processor is further configured to determine the neural network based at least in part on a positioning method used to determine a location of the apparatus.

40. The apparatus of clause 37 wherein the neural network is one of a plurality of neural networks stored in a data structure in the memory.

The invention claimed is:

1. A method for determining a line of sight delay, an angle of arrival, or an angle of departure value, comprising:
  receiving reference signal information;
  determining a channel frequency response or a channel impulse response based on the reference signal information;
  processing the channel frequency response or the channel impulse response with a neural network; and
  determining the line of sight delay, the angle of arrival, or the angle of departure value based on an output of the neural network, wherein the output of the neural network is based at least on the channel frequency response or the channel impulse response input into the neural network.

2. The method of claim 1 wherein the reference signal information is a sounding reference signal measurement.

3. The method of claim 1 wherein the reference signal information is a channel state information reference signal measurement.

4. The method of claim 1 further comprising determining the neural network based at least in part of a positioning method used for determining a location of a mobile device.

5. The method of claim 4 further comprising determining the neural network based at least in part on a receiver configuration.

6. The method of claim 5 wherein the receiver configuration includes an antenna configuration and a phase coherence state of the antenna configuration.

7. The method of claim 1 wherein the neural network is one of a plurality of neural networks stored in a data structure.

8. The method of claim 1 further comprising determining a required desired accuracy associated with the output of the neural network, and wherein processing the channel impulse response with the neural network includes adapting one or more weights in the neural network based on the required desired accuracy.

9. The method of claim 1 wherein the output of the neural network includes a quality estimate.

10. The method of claim 9 wherein determining the line of sight delay, the angle of arrival, or the angle of departure value is based at least in part on the quality estimate.

11. An apparatus for determining a line of sight delay, an angle of arrival, or an angle of departure value, comprising:
  a memory;
  at least one transceiver;
  at least one processor communicatively coupled to the memory and the at least one transceiver, and configured to:
  receive reference signal information;
  determine a channel frequency response or a channel impulse response based on the reference signal information;
  process the channel frequency response or the channel impulse response with a neural network; and
  determine the line of sight delay, the angle of arrival, or the angle of departure value based on an output of the neural network, wherein the output of the neural network is based at least on the channel frequency response or the channel impulse response input into the neural network.

12. The apparatus of claim 11 wherein the reference signal information is a sounding reference signal measurement.

13. The apparatus of claim 11 wherein the reference signal information is a channel state information reference signal measurement.

14. The apparatus of claim 11 wherein the at least one processor is further configured to determine the neural network based at least in part on a positioning method used to determine a location of a mobile device.

15. The apparatus of claim 14 wherein the at least one processor is further configured to determine the neural network based at least in part on a configuration of the at least one transceiver.

16. The apparatus of claim 15 wherein the configuration of the at least one transceiver includes an antenna configuration and a phase coherence state of the antenna configuration.

17. The apparatus of claim 11 wherein the neural network is one of a plurality of neural networks stored in a data structure.

18. The apparatus of claim 11 wherein the at least one processor is further configured to determine a required desired accuracy associated with the line of sight delay and adapt one or more weights in the neural network based on the required desired accuracy.

19. The apparatus of claim 11 wherein the output of the neural network includes a quality estimate.

20. The apparatus of claim 19 wherein the at least one processor is further configured to determine the line of sight delay, the angle of arrival, or the angle of departure value based at least in part on the quality estimate.

21. A method, performed on a mobile device, for determining a line of sight delay, an angle of arrival, or an angle of departure value, comprising:
   receiving reference signal information;
   determining a channel frequency response or a channel impulse response based on the reference signal information;
   processing the channel frequency response or the channel impulse response with a neural network; and
   determining the line of sight delay, the angle of arrival, or the angle of departure value based on an output of the neural network, wherein the output of the neural network is based at least on the channel frequency response or the channel impulse response input into the neural network.

22. The method of claim 21 wherein the reference signal information is a positioning reference signal measurement.

23. The method of claim 21 further comprising determining the neural network based at least in part on a receiver configuration in the mobile device.

24. The method of claim 23 wherein the determining the neural network includes receiving neural network information from a network server.

25. The method of claim 23 wherein determining the neural network includes receiving an indication of a selected neural network from a list of neural networks available at the mobile device.

26. The method of claim 21 wherein the neural network is one of a plurality of neural networks stored in a data structure on the mobile device.

* * * * *